United States Patent [19]

Suzuki

[11] Patent Number: 4,484,779
[45] Date of Patent: Nov. 27, 1984

[54] DOUBLE FOLDING MECHANISM FOR VEHICLE SEATS

[75] Inventor: Saburo Suzuki, Anjo, Japan

[73] Assignee: Aisin Seiki Kabushiki Kaisha, Kariya, Japan

[21] Appl. No.: 398,409

[22] Filed: Jul. 14, 1982

[30] Foreign Application Priority Data

Jul. 15, 1981 [JP] Japan .......................... 56-104969[U]

[51] Int. Cl.³ ............................................. B60N 1/04
[52] U.S. Cl. .................................. 297/326; 297/331; 297/379
[58] Field of Search ............... 297/379, 328, 326, 324, 297/325, 335, 336, 331

[56] References Cited

U.S. PATENT DOCUMENTS

| 1,732,169 | 10/1929 | Provost et al. | 297/326 |
| 3,727,976 | 4/1973 | Lystad | 297/379 |
| 3,880,464 | 4/1975 | Murphy et al. | 297/326 |
| 4,312,537 | 1/1982 | Lindenberg | 297/379 |

FOREIGN PATENT DOCUMENTS

| 2949552 | 10/1980 | France | 297/379 |
| 20520 | 2/1979 | Japan | 297/379 |
| 1434872 | 5/1976 | United Kingdom | 297/379 |

Primary Examiner—William E. Lyddane
Assistant Examiner—Mark W. Binder
Attorney, Agent, or Firm—Oblon, Fisher, Spivak, McClelland & Maier

[57] ABSTRACT

A double folding mechanism for a vehicle seat is disclosed. An intermediate bracket is pivoted to the seat cushion bracket and the backrest bracket. The intermediate bracket carries a latch and a release lever. The release lever is connected to a latch for securing the seat cushion to the vehicle floor by a cable.

3 Claims, 2 Drawing Figures

DOUBLE FOLDING MECHANISM FOR VEHICLE SEATS

BACKGROUND OF THE INVENTION

1. Field of the Invention

The present invention relates to a double folding mechanism, and more particularly to a double folding mechanism for vehicle seats.

Description of the Prior Art

Generally a double folding operation for vehicle seats with a double folding mechanism is attained as follows: a backrest of a seat is fully folded foreward onto a seat cushion. The seat cushion is then forwardly rotated about a fulcrum on the front side of the seat after releasing the rear side of the seat cushion from a vehicle floor, this being done while the fully folded state of the backrest on the seat cushion is maintained.

In a conventional double folding mechanism for vehicle seats an operating lever is specially provided for double folding, or a double folding operation is attained by cooperation of a seat reclining mechanism for the vehicle seat and a mechanism for releasing a rear side of a seat cushion from a vehicle floor, so that the construction of the mechanism is complicated.

SUMMARY OF THE INVENTION

An object of the present invention is to provide an improved double folding mechanism for vehicle seats which obviates the aforementioned drawback of the described conventional double folding mechanism.

A further object of the present invention is to provide an improved double folding mechanism for vehicle seats which is relatively simple and includes a minimum number of parts.

A still further object of this invention is to provide an improved double folding mechanism for vehicle seats which can be reliably moved and double folded.

BRIEF DESCRIPTION OF THE DRAWINGS

Various other features, objects and attendant advantages of the present invention will become self evident when considered in connection with the accompanying drawings, wherein.

DETAILED DESCRIPTION OF THE PREFERRED EMBODIMENTS

Figure 1:
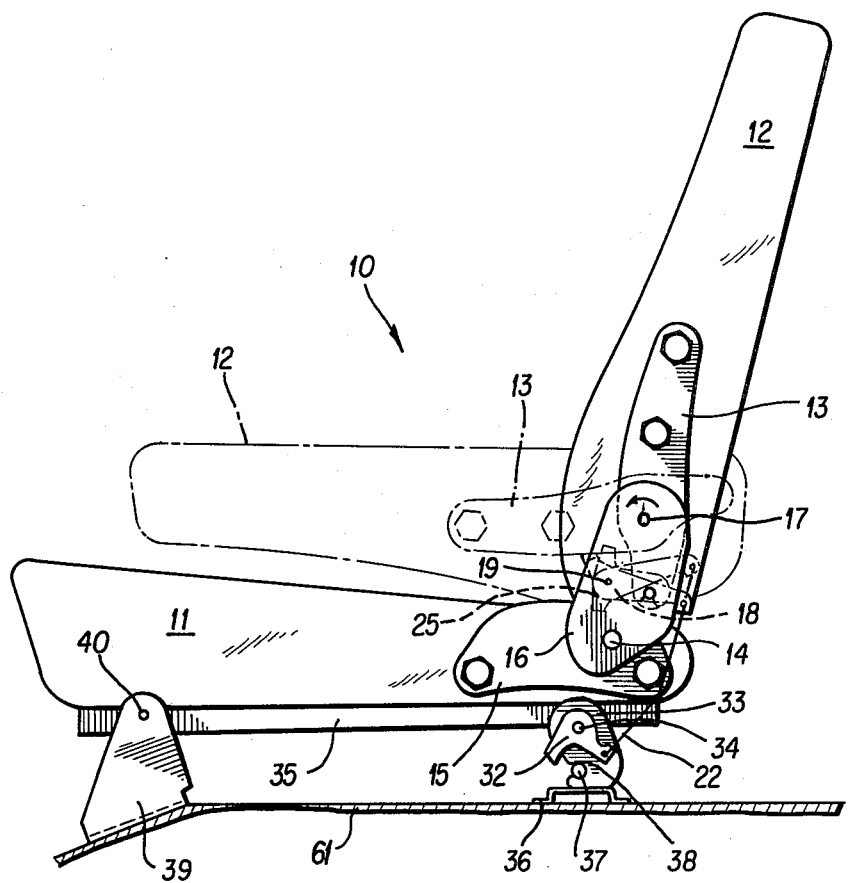
FIG. 1 is a side view which shows a preferred embodiment of a double folding mechanism for vehicle seats according to the present invention.
Figure 2:
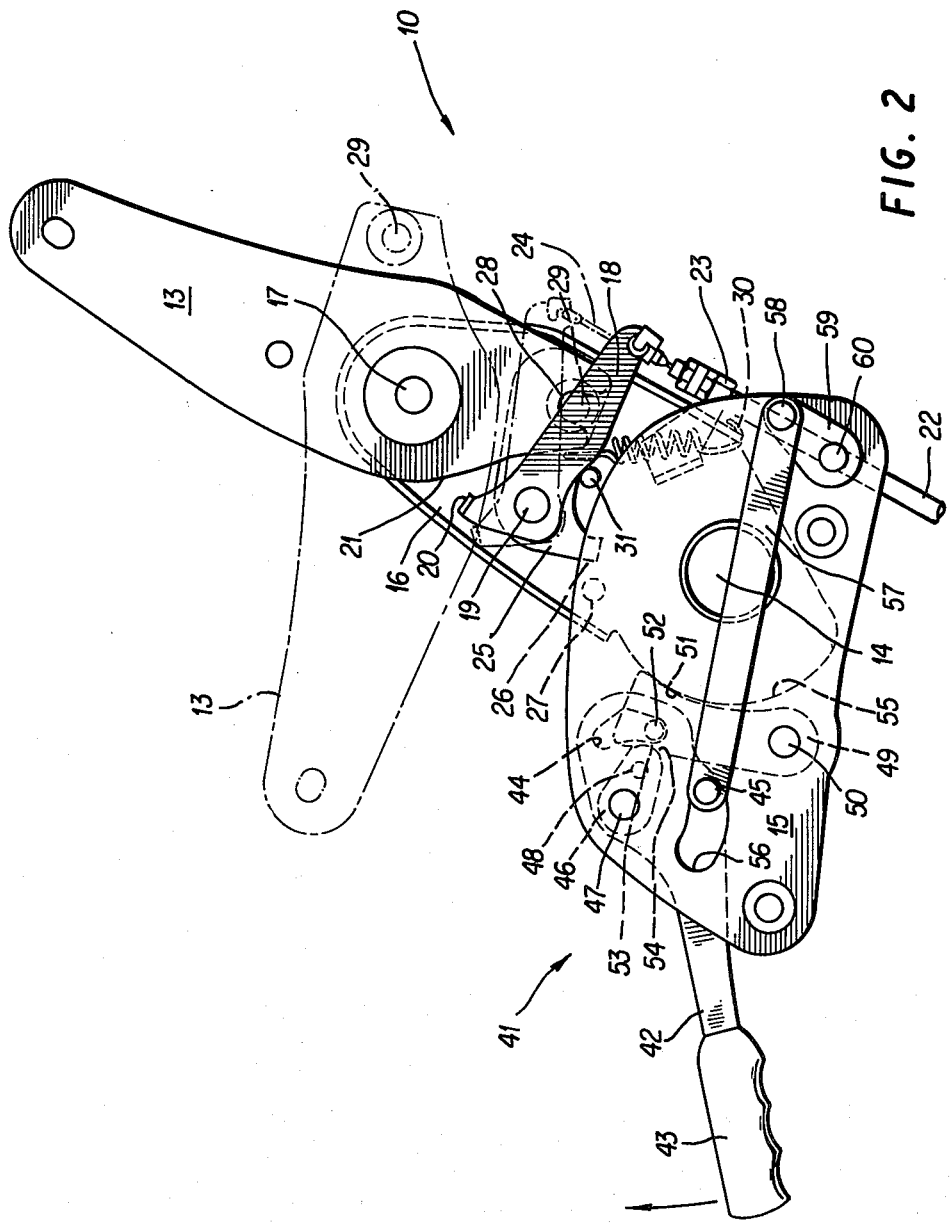
FIG. 2 is a view similar to FIG. 1, showing an essential portion of the double folding mechanism for vehicle seats of the present invention, said essential portion being turned 180° about a vertical axis with respect to FIG. 1.

Referring now to FIGS. 1 and 2, reference numeral 10 denotes a seat including a seat cushion 11 and a backrest 12. A backrest bracket 13 of the backrest 12 is pivotably supported on a seat cushion bracket 15 of the seat cushion 11 by second hinge axle 17 and an intermediate bracket, described below.

Reference numeral 16 indicates the intermediate bracket whose lower side is pivotably supported on the first hinge axle 14 and whose upper side pivotally supports the backrest bracket 13 by the second hinge axle 17. Accordingly, the backrest 12 of the seat 10 is rotatable around the second hinge axle 17.

Reference numeral 18 shows a release lever having one end pivotably supported on a pin 19 mounted on the intermediate bracket 16. A flange 20 provided on one end of the release lever 18 is engageable with a cam face 21 of the backrest bracket 13 when the backrest 12 is folded on the seat cushion 11. Reference numeral 22 denotes a cable which is supported by a bracket 23 fixed to the seat cushion bracket 15 and is provided with a wire 24 therein. The other end of the release lever 18 is operatively connected to one end of the wire 24.

Reference numeral 25 indicates a latch pivotably supported on the pin 19 together with the release lever 18. A hooked portion 26 is provided on one end of the latch 25 and is engaged with a pin 27 of the seat cushion bracket 15 when the intermediate bracket 16 is rotated counterclockwise around the first hinge axle 14. A recessed portion 28 is provided on other end of the latch 25 and is engaged with a pin 29 mounted on a lower end of the backrest bracket 13 in solid line position of FIGS. 1 and 2.

Reference numeral 30 is a spring having one end engaged with a central lower portion of the latch 25 and other end with the intermediate bracket 16 for urging the latch 25 so as to rotate clockwise around the pin 19. Reference numeral 31 denotes a pin which can engage with the latch 25 so as to prevent the latch 25 from clockwise rotation beyond a predetermined value around the pin 19.

The other end of the wire 24 is operatively connected with a plate 32 which is pivotably supported on a frame 35 fixed on the seat cushion 11 by a pin 34 which is integral with a latch 33 so that the plate 32 and the latch 33 can move together. A striker 37 is fixed to a bracket 36 fixedly attached on a vehicle floor 61 and is engageable with an engaging groove 38 of the latch 33. The ends of a spring, not shown, are respectively engaged with the frame 35 and the plate 32 for urging the latch 33 in the direction so as to engage the engaging groove 38 of the latch 33 with the striker 37.

Reference numeral 39 is a bracket fixed to the vehicle floor 61 and the seat cushion 11 of the seat 10 is pivotably supported on the bracket 39 by a pin 40 through the frame 35. Accordingly, the seat cushion 11 of the seat 11 is rotatable around the pin 40, after the engaging groove 38 of the latch 33 is released from the striker 37 of the bracket 36.

Reference numeral 41 denotes a well known seat reclining mechanism which is constructed as follows:

An operating handle 42 is provided with an operating portion 43 at one end thereof and with a groove 44 and a pin 45 at other end thereof. One end of a cam member 46 is pivotably supported by a pin 47 mounted on the seat cushion bracket 15 and other thereof is fixed to the operating handle 42 by a pin 48. Reference numeral 49 indicates a pawl of which one end is pivotably supported on the seat cushion bracket 15 by a pin 50 and other end is provided with a plurality of teeth 51, a pin 52 inserted into the groove 44 of the operating handle 42 and an engaging surface 54 engageable with a cam portion 53 of the cam member 46. The teeth 51 of the pawl 49 are engageable with a plurality of latching teeth 55 formed on a circumferential lower end of the intermediate bracket 16. The pin 45 of the operating handle 42 passes through a slot 56 of the seat cushion bracket 15 and is operatively connected to one end of a connecting link 57. Other end of the connecting link 57 is operatively connected to a connecting shaft 60 through a pin 58 and a plate 59.

The operation according to the invention is as follows:

In order to attain the double folded state of the seat 10 by fully folding the backrest 12 of the seat 10 on the seat cushion 11 and further forwardly rotating the seat cushion 11, the operating handle 42 is first rotated clockwise around the pin 47 (in the arrow direction in FIG. 2). At this time, the cam member 46 is also rotated clockwise around the pin 47 and the cam portion 53 of the cam member 46 is released from the engaging surface 54 of the pawl 49 while the pin 52 of the pawl 49 is guided in the groove 44 of the operating handle 42 so that the pawl 49 is rotated counterclockwise around the pin 50. Accordingly the teeth 51 of the pawl 49 are released from the latching teeth 55 of the intermediate bracket 16. In the meantime the pin 45 of the operating handle 42 is displaced into the left upper position of the slot 56 of the seat cushion bracket 15 according to the clockwise rotation of the operating handle 42 around the pin 47. As a result, the connecting link 57 is displaced leftwardly by the pin 45 and rotates the connecting shaft 60 via the pin 58 and the plate 59. This results in a seat reclining mechanism, not shown, provided on other side of the seat to be similarly released according to the rotation of the connecting shaft 60.

Thereafter, the hooked portion 26 of the latch 25 and the pin 27 of the seat cushion bracket 15 are engaged with each other and the latch 25 is rotated counterclockwise around the pin 19, according to the counterclockwise rotation of the backrest 12 of the seat 10 around the first hinge axle 14 and the counterclockwise rotation of the intermediate bracket 16 around the first hinge axle 14. Accordingly, the recessed portion 28 of the latch 25 is released from the pin 29 of the backrest bracket 13 so that the backrest 12 of the seat 10 becomes counterclockwise rotatable around the second hinge axle 17 by pressing the backrest 12 from the rear; i.e., the backrest bracket 13 can be rotated counterclockwise around the second hinge axle 17 and can be fully folded on the seat cushion 11. At this time (in the state of chain and dotted lines in FIGS. 1 and 2), the flange 20 of the release lever 18 is depressed by the cam surface 21 of the backrest bracket 13; that is, the release lever 18 is rotated counterclockwise around the pin 19. Accordingly, the wire 24 of the cable 22 operatively connected to the release lever 18 is pulled upwardly, as seen in the Figures. As a result, the plate 32 and the latch 33 are counterclockwise rotated around the pin 34 and the engaging groove 38 of the latch 33 is released from the striker, so that the seat 10 can be fully folded by the counterclockwise rotation of the seat 10 around the pin 40 while the backrest 12 of the seat 10 is fully folded on the seat cushion 11.

In order to displace the seat 10 from the abovementioned folded state to the state shown is solid lines in FIGS. 1 and 2, the seat 10 is rotated clockwise around the pin 40 while the backrest 12 of the seat 10 is fully folded on the seat cushion 11 until the seat 10 moves to the state shown in chain and dotted lines in FIGS. 1 and 2.

If the backrest 12 of the seat 10 is thereafter rotated clockwise around the second hinge shaft 17, the cam surface 21 of the backrest bracket 13 is released from the flange 20 of the release lever 18, so that the release lever 18 is rotated clockwise around the pin 19 by the wire 24 of the cable 22 acting under the urging force of the spring, not shown, for urging the plate 32. As a result, the engaging groove 38 of the latch 33 is engaged with the striker 37 according to the clockwise rotation of the plate 32 in FIG. 1. In the meantime the intermediate bracket is rotated clockwise around the first hinge axle 14 so that the hooked portion 26 of the latch 25 is released from the pin 27 of the seat cushion bracket 15 and the latch 25 is rotated clockwise around the pin 19. Thereby, the recessed portion 28 of the latch 25 is engaged with the pin 29 of the backrest bracket 13. As a result, the solid line state in FIGS. 1 and 2 is obtained.

By the foregoing, there has been disclosed a preferred form of double folding mechanism for vehicle seats constructed in accordance with the present invention. It will be appreciated that various additions, substitutions, modifications and omissions may be made thereto without departing from the spirit of the invention. What is claimed as new and desired to be secured by Letters Patent of the United States is:

1. A double folding mechanism for a vehicle seat having a seat including a seat cushion and a backrest, said mechanism comprising:

a seat cushion bracket provided on said seat cushion;

an intermediate bracket having one end pivotably supported on said seat cushion bracket by a first hinge axle;

a seat reclining mechanism provided between said seat cushion bracket and said intermediate bracket for adjusting said backrest around said first hinge axle;

a backrest bracket provided on said backrest and pivotably supported on another end of said intermediate bracket by a second hinge axle, said backrest bracket being provided with a pin and a cam surface at one end thereof;

a latch having one end pivotably supported on said intermediate bracket and provided with a recessed portion engageable with said pin of said backrest bracket for preventing said backrest bracket from rotation around said second hinge axle;

said latch being provided with a hooked portion engageable with a pin formed on said seat cushion bracket so that said pin of said backrest bracket is disengaged from said recessed portion of said latch when said intermediate bracket is rotated around said first hinge axle by the operation of said seat reclining mechanism;

a release lever pivotably supported on said intermediate bracket and provided at one end with a flange engageable with said cam surface of said backrest bracket; and cable means having one end operatively connected to another end of said release lever, said cable means having another end operatively connected to means for providing engagement and disengagement between said seat cushion and a vehicle floor.

2. A double folding mechanism for vehicle seats as set forth in claim 1, further comprising:

a spring having one end engaged with said latch and another end engaged with said intermediate bracket for urging said latch into engagement with said pin.

3. A double folding mechanism for vehicle seats as set forth in claim 1, further comprising:

a pin mounted on said intermediate bracket for engaging said latch and preventing said latch from the rotation beyond a predetermined value.

* * * * *

UNITED STATES PATENT AND TRADEMARK OFFICE
CERTIFICATE OF CORRECTION

PATENT NO.  :  4,484,779
DATED       :  November 27, 1984
INVENTOR(S) :  Saburo Suzuki It is certified that error appears in the above-identified patent and that said Letters Patent is hereby corrected as shown below:

Title Page of Patent, beneath the Abstract, change "2 Drawing Figures" to --3 Drawing Figures--.

Figure 3:
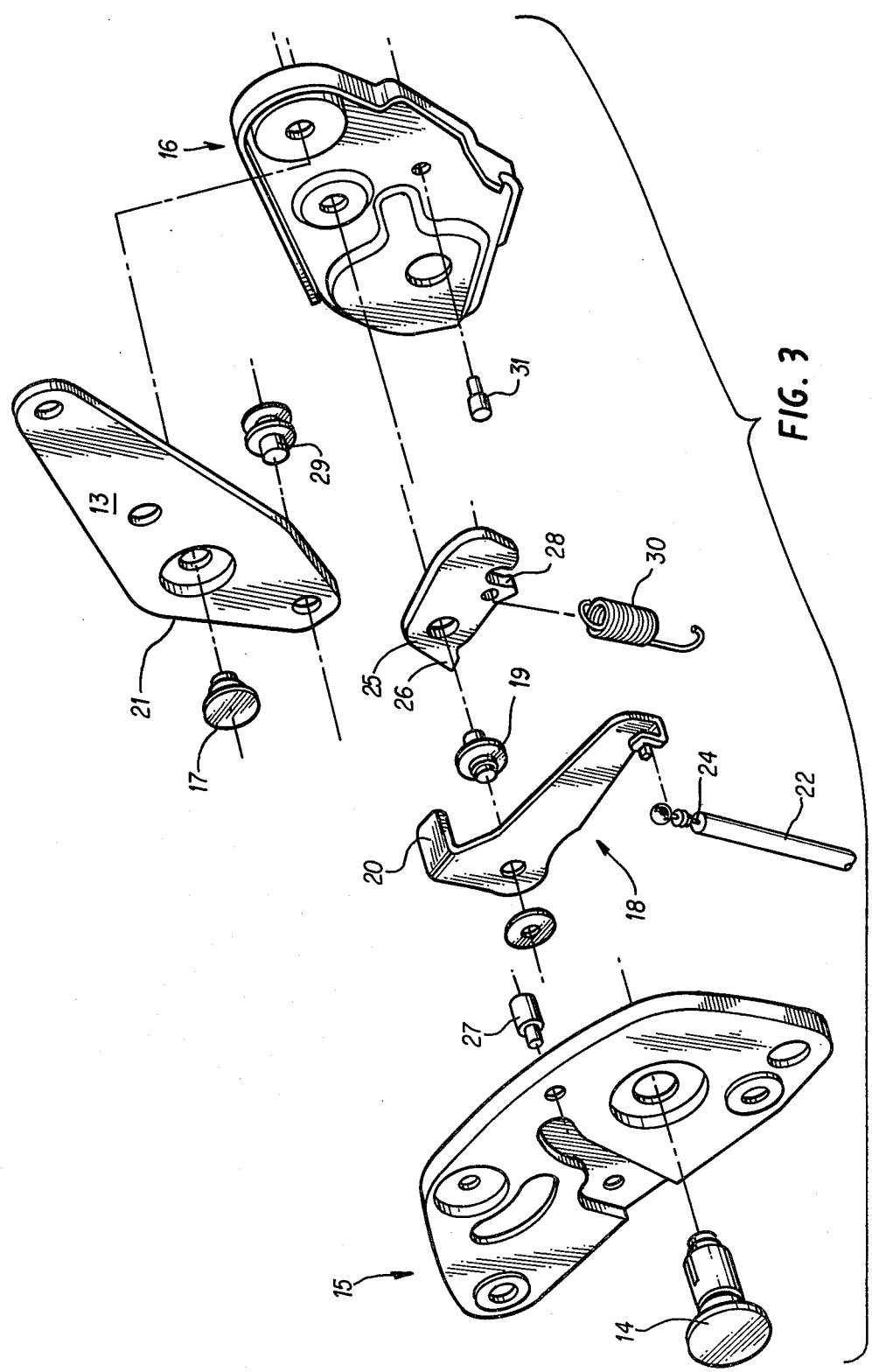

Column 1, line 53, delete the period after "1" and insert --; and FIG. 3 is an exploded view of FIG 2.--.

Signed and Sealed this

Twenty-seventh Day of August 1985

[SEAL]

*Attest:*

DONALD J. QUIGG

*Attesting Officer*   *Acting Commissioner of Patents and Trademarks*